US010457526B2

(12) United States Patent
Inglis et al.

(10) Patent No.: US 10,457,526 B2
(45) Date of Patent: Oct. 29, 2019

(54) METHOD AND APPARATUS FOR DETECTING OVERLOAD DISTORTION

(71) Applicant: Tiger Lifting UK Limited, Alnwick Northumberland (GB)

(72) Inventors: David Inglis, Alnwick Northumberland (GB); Charles Tsao, Alnwick Northumberland (GB); Steven Tsao, Alnwick Northumberland (GB)

(73) Assignee: Tiger Lifting UK Limited (GB)

( * ) Notice: Subject to any disclaimer, the term of this patent is extended or adjusted under 35 U.S.C. 154(b) by 36 days.

(21) Appl. No.: 15/527,617

(22) PCT Filed: Nov. 17, 2015

(86) PCT No.: PCT/GB2015/053475
§ 371 (c)(1),
(2) Date: May 17, 2017

(87) PCT Pub. No.: WO2016/079488
PCT Pub. Date: May 26, 2016

(65) Prior Publication Data
US 2017/0341913 A1 Nov. 30, 2017

(30) Foreign Application Priority Data
Nov. 17, 2014 (GB) .................... 1420387.1

(51) Int. Cl.
*B66C 1/40* (2006.01)
*G01B 5/30* (2006.01)
(Continued)

(52) U.S. Cl.
CPC ................ *B66C 1/40* (2013.01); *G01B 5/30* (2013.01); *G01L 5/0071* (2013.01); *G01L 5/047* (2013.01)

(58) Field of Classification Search
CPC ....... G01L 5/0071; G01L 5/047; G01L 3/106; G01L 1/26; G01B 5/20; G01B 5/30;
(Continued)

(56) References Cited

U.S. PATENT DOCUMENTS 4,112,750 A * 9/1978 Murakami ................ B66C 1/40
177/147
4,361,506 A 11/1982 Russo
(Continued)

FOREIGN PATENT DOCUMENTS

DE         10234626     2/2004
JP          56122850     9/1981
(Continued)

OTHER PUBLICATIONS

Corresponding Search Report for GB1420387.1 dated May 13, 2015. GB.
(Continued)

*Primary Examiner* — Octavia Hollington
(74) *Attorney, Agent, or Firm* — The Belles Group, P.C.

(57) ABSTRACT

A method and apparatus for detecting overload distortion in lifting and the like gear is disclosed. The apparatus includes a hook with two reference points thereon defining, in the undistorted state of the hook, a reference dimension. The hook also has a standard dimension provided on the hook and conveniently accessible for reference purposes. The standard dimension is also a pair of points and one of this pair is coincident with one of the reference points thereby forming a triangle of points on the hook.

10 Claims, 3 Drawing Sheets

(51) Int. Cl.
*G01L 5/00* (2006.01)
*G01L 5/04* (2006.01)

(58) Field of Classification Search
CPC .... B66C 1/40; B66C 1/22; B66C 1/34; G01N 3/00; F16G 17/00; F16G 15/00
USPC .................................................. 73/862, 621
See application file for complete search history.

(56) References Cited

U.S. PATENT DOCUMENTS

| | | | |
|---|---|---|---|
| 5,103,755 A * | 4/1992 | Garrett | B66C 1/12 |
| | | | 116/200 |
| 5,193,480 A * | 3/1993 | Garrett | B66C 1/12 |
| | | | 116/200 |
| 5,452,679 A | 9/1995 | Eckley | |
| 9,850,103 B2 * | 12/2017 | Lopes | B66C 1/40 |

FOREIGN PATENT DOCUMENTS

| | | |
|---|---|---|
| JP | 60148784 | 8/1985 |
| JP | H08282959 | 10/1996 |
| WO | 9212922 | 8/1992 |

OTHER PUBLICATIONS

Corresponding International Search Report for PCT/GB2015/053475. WO.

* cited by examiner

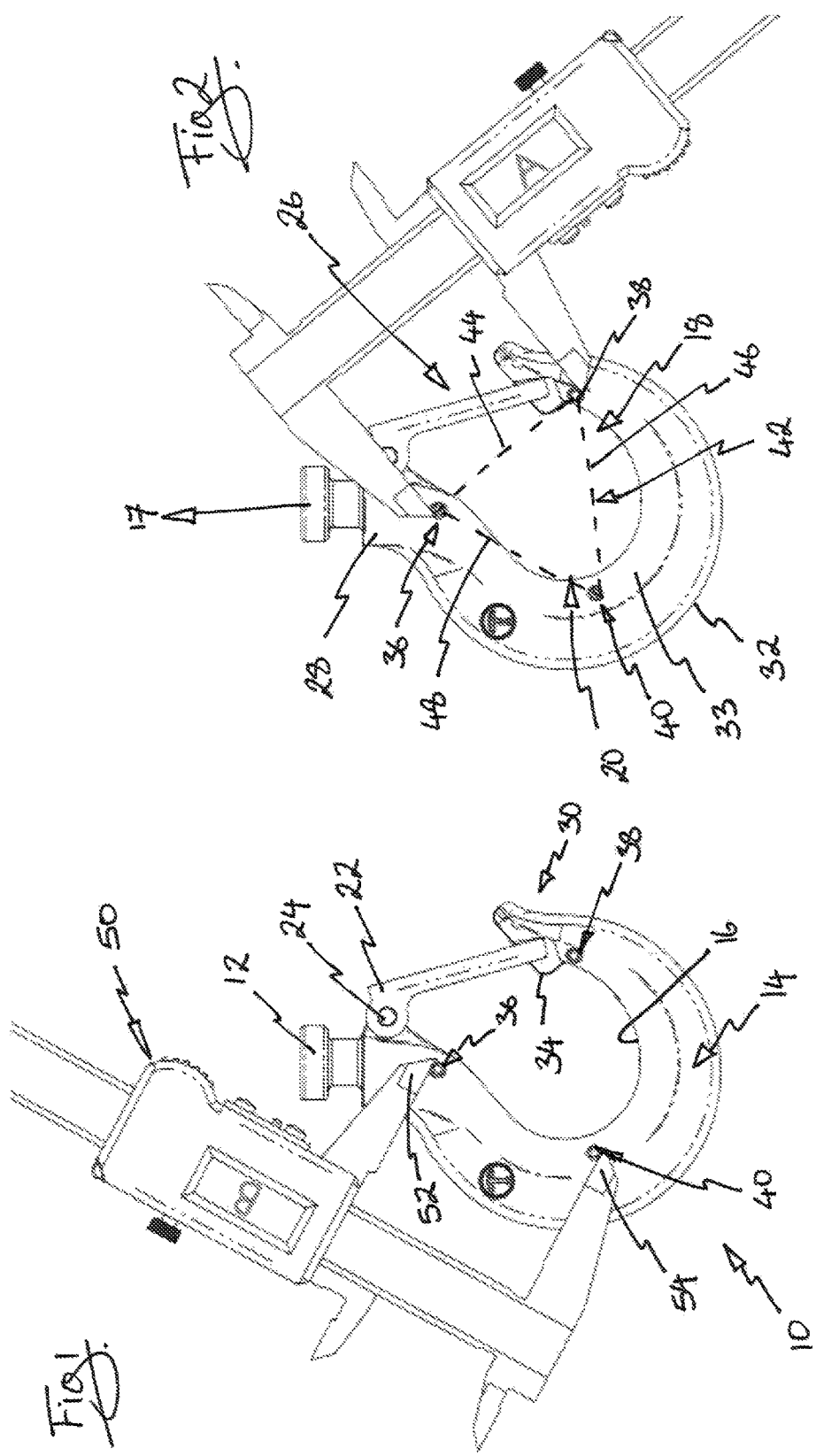

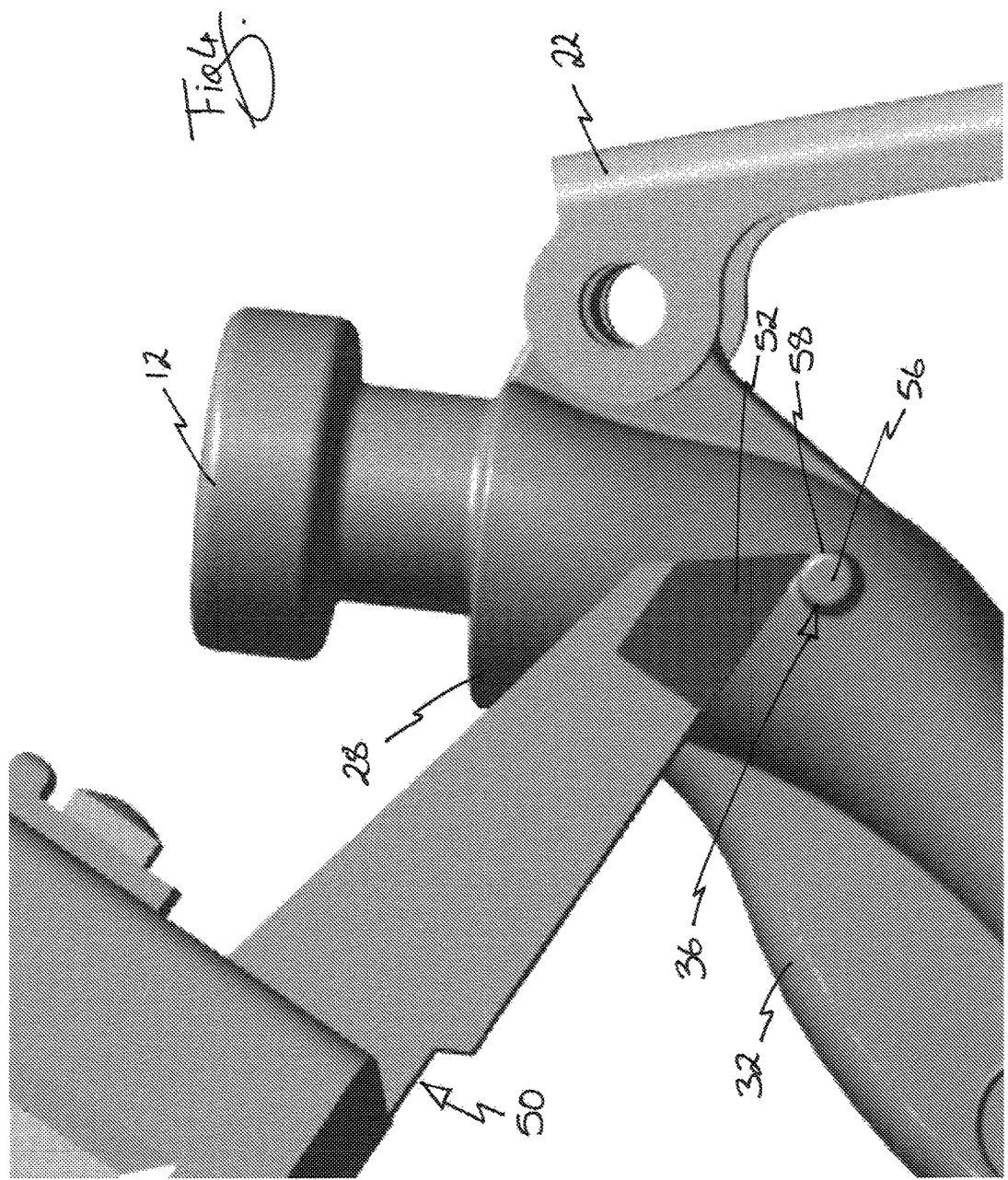

METHOD AND APPARATUS FOR DETECTING OVERLOAD DISTORTION

The present application is a U.S. national stage entry under 35 U.S.C. § 371 of Patent Cooperation Treaty patent application Ser. No. PCT/GB2015/053475, filed Nov. 17, 2015, which claims priority to GB patent application Ser. No. 1420387.1, filed Nov. 17, 2014, the entireties of which are incorporated herein by reference.

This invention relates to a method and apparatus for detecting overload distortion. A specific application of the invention relates to such method and apparatus for detecting overload distortion in lifting apparatus such as a hoist for use in automotive service gear typically comprising a hook and used to lift an automotive engine from its mounting in an automobile, truck, or the like. The invention enables the detection of stretching, shock-loading and general abuse of such a hook. An enormous range of applications for hoist and the like gear exist. More generally, the invention provides a method and means for detecting overload distortion for use in relation to hoist and the like hooks and related quick-attach means for lifting and the like applications, where lifting and bending loads may, in shock and related overload and abuse situations, cause stretching and other distortion of such hook or the like means, rendering them unfit and/or unsafe for further use.

Prior proposals in relation to such hook and the like quick-attach devices, include the provision of printed tables in user guides accompanying the lifting gear and requiring (for the determination of overload occurrence) the measurement of the hook and reference to the tables to identify elongation or stretching. It has also been suggested to provide two forged marks on the hooks for measurement purposes, likewise to enable the identification of elongation or stretching by reference to printed or known data.

Other prior proposals in relation to such hook and the like quick-attach devices, for enabling detection of overload distortion include the disclosures in WO9212922 and U.S. Pat. No. 5,452,679. These proposals suggest the provision of formations on the structure of a hoist hook enabling detection of overload distortion by, in the WO 9212922 case, the user measuring the gap between two formations, disposed at opposite sides across the open mouth of the hook, against a known dimension for the undistorted hook. In the U.S. Pat. No. 5,452,679 case, the method involves the user determining the alignment or otherwise of formations likewise disposed on opposite sides of the open mouth of the hook. Such alignment determination is made visually directly using a straight-edge device such as a ruler applied directly to the hook, or remotely using an optical device with cross-wires.

Shortcomings of these prior printed proposals include the fact that neither is particularly well-adapted for use in everyday workshop and other workplace conditions. In the case of the method requiring detection of non-alignment of formations, there is a need for the user to use as his/her alignment parameter, a "straight line segment 21" which is located on the waisted inboard hook portion just below its attachment yoke 15. Thus the length of the "straight line segment 21" is, at most, the width of the waisted portion of the hook, which, in terms of aligning a ruler or other straight-edge device applied to it by an operative's gloved-hand, is inevitably somewhat minimal, with consequential corresponding implications for the accuracy of the alignment (or otherwise) determination.

In the case of the method requiring measurement of the gap between two formations disposed at opposite sides across the open mouth of the hook, against a known dimension for the undistorted hook, there is the requirement at the precise moment when the need to carry out a prescribed safety check prior to carrying out an urgent lifting operation arises, to know the standard (undistorted) dimension, and to have access to linear gap-measurement means (calibrated in the same length units) and enabling the user to make a reasonably accurate determination of the gap for comparison with this.

An object of the present invention is to provide a method and apparatus offering one or more improvements in relation to matters discussed above and/or generally.

According to the invention there is provided a method and apparatus for detecting overload distortion in lifting and the like gear comprising a hook or the like quick-attach means which is susceptible to overload distortion. In accordance with the invention, the said hook or the like quick-attach means is provided with three reference points, for example in the form of formations such as inwardly or outwardly-projecting (concave or convex, whether rounded or not) location-defining formations, at locations thereon defining, in the undistorted state of said hook or the like, an isosceles or equilateral triangle. In accordance with the method of the invention, there is provided the step of comparing the dimensions of two sides of the isosceles or equilateral triangle, one of which includes) the dimension of said hook or the like (such as the mouth of the hook) which is the more liable to dimensional increase in the case of overload distortion.

If no overload distortion has occurred, the two dimensions will (within defined acceptable limits) be equal and will thus indicate that safe continuance of use may proceed. If the two dimensions are (within defined acceptable limits) unequal, then the method has detected overload distortion and appropriate remedial steps are required before repetition of loading can occur.

According to a second aspect of the invention, a method for detecting overload distortion in lifting and the like gear comprises:
(i) providing a hook or the like quick-attach means which is susceptible to overload distortion;
(ii) providing said hook or the like quick-attach means with two reference points thereon defining, in the undistorted state of said hook or the like, a reference dimension in a portion of said hook which is liable to dimensional increase in the case of overload; and
(iii) comparing the dimension of said reference dimension with known data after subjecting said hook or the like to possible overloading, in order to determine whether overload distortion has occurred;
characterised by
(iv) said step of comparing the dimension of said reference dimension with known data after subjecting said hook or the like to possible overloading is performed by comparing said reference dimension with known data in the form of a standard dimension provided on said hook and conveniently accessible for reference purposes.

In the method defined in the preceding paragraph, said reference dimension and said standard dimension are preferably defined by formations provided on said hook at spaced locations thereon and defining the corners of an isosceles triangle, and said step of comparing is performed by establishing identity of dimension or not. A further preferred feature is that said step of comparison may be performed by applying a piece of string or thread or the like ('dimension-indicating or temporary-dimension-storing means') across the pairs of formations defining said triangle.

A still further aspect of the invention provides a hook or the like quick-attach means which is susceptible to overload distortion:
(i) said hook or the like quick-attach means comprising two reference points thereon defining, in the undistorted state of said hook or the like, a reference dimension in a portion of said hook which is liable to dimensional increase in the case of overload; and
(ii) said reference dimension being comparable with known data after subjecting said hook or the like to possible overloading, in order to determine whether overload distortion has occurred;
characterised by
(iii) said hook comprising, in addition to said reference points defining said reference dimension, at least one further reference point defining a standard dimension provided on said hook and conveniently accessible for reference purposes, and
(iv) said step of comparing the dimension of said reference dimension with known data after subjecting said hook or the like to possible overloading is performed by comparing said reference dimension with said standard dimension.

In the further aspect of the invention defined in the preceding paragraph, said reference points defining said reference and said standard dimensions preferably comprise three such points disposed at the corners of an isosceles triangle. Moreover, said reference points are preferably disposed at the corners of an equilateral triangle. And in another preferred embodiment, said reference formations are provided in the form of upstanding projections from the surface of the hook and formed integrally therewith and having side surfaces well-adapted for engagement with the blades of an adjustable tool, such as a calliper, adapted to be rapidly adjusted to the dimension of said reference dimension and for rapid disengagement therefrom and re-engagement with the formations defining said standard dimension for detection of any difference in dimension.

An advantage provided by an embodiment of the invention described below is that determination of the safety (or otherwise) status of lifting or the like gear in accordance with the invention can be carried out satisfactorily even in the classic 'rough-and-ready' on-site work location where conventional accurate length-measurement gear (such as callipers) may not always be readily to-hand, and in accordance with an advantage provided by a described embodiment of the invention, all that the operative needing to make the check needs to have to-hand for the purpose, is a length of string or thread or the like, such as a pencil—which could be marked in two places along its length or held in two hands with thumbnails indicating the relevant reference dimension. In such a case, a determination of the safety status of the hook can be made simply by manually applying the string or thread or the like to the hook, first across the formations defining one of the (originally) equal sides of the triangle of the invention, and then, maintaining the now-defined-by-the-string-or-thread one dimension of the triangle, applying same across the other formations defining the other of the (originally) equal sides of the triangle of the invention for comparison purposes. If the dimensions are equal, no distortion has been detected. If unequal, then distortion has been detected and remedial or replacement steps need to be taken in relation to the hook.

It needs to be understood that the measurement or comparison of the relevant dimensions of the triangle in accordance with the method of the invention should preferably be carried out in the unstressed, after-use, state of the the hook or the like quick-attach means. If measurement were carried out in the stressed, during-use, state, it would be possible to obtain usable measurement data but in such a case appropriate corresponding interpretation of the results so obtained would be necessary. Thus, for example, in the case of measurement in the stressed (but not overstressed) state, that is to say, under any reasonable normal load (up to and below the elastic limit of the material) applied to the hook or the like, there will, of course, be a calculable theoretical corresponding degree of elastic deflection of the material of the hook in accordance with the stress modulus of that material, and the dimension of the triangle side corresponding to the open mouth of the hook (the reference dimension), which is the more liable to dimensional increase in the case of overload distortion, will correspondingly increase. The other two dimensions of the triangle of the invention will also theoretically increase, though usually (depending on the geometrical variables, in particular the direction of the line of action of the applied load in relation to the axis of the hook), to a lesser extent. Accordingly, it will be seen that in the case of measurement in the stressed (but not overstressed) condition of the hook, there will be a theoretical dimensional difference between the sides of the triangle of the invention arising from differential deflection of the material of the hook or the like in accordance with the geometry of the hook and of the applied load, and indeed arising from geometry of the structure of the hook. These latter differential calculable dimensional differences may well, for practical workshop purposes, such as hoists used for the lifting of automobile engines and the like, usually be considered 'de minimis' or too small to be readily measurable by the means envisaged for the purposes of the invention, and could be ignored. Accordingly it can now be seen in the light of this latter discussion that measurement under load, though usually less-convenient than measurement unloaded, may be adopted if (probably somewhat unusual) circumstances arose requiring it or making it more convenient.

For ease of reference in the ongoing disclosure of the invention, it is desirable at this point to provide some reference names enabling identification of the individual ones of the reference locations or formations on the hook or like quick-attach means. In the described embodiment, the quick-attach means is in the form of a hook of generally conventional 'open-mouthed hook' shape and proportions. The hook is provided with the aforesaid three location-defining formations or reference points. These reference points, in the embodiment are in the form of outwardly-projecting convex round-but-flat-topped location-defining formations, at locations around the curved inner load-applying lifting edge of the hook, defining, as aforesaid, in the undistorted state of said hook or the like, an isosceles or equilateral triangle. The formation which, in the described embodiment in which the hook is generally upright and intended to apply generally upwardly-directed lifting loads to a (not-shown) load for example via a chain engaged with the hook, is uppermost and nearest to the attachment location where the hook is joined to a load-bearing member applying lift to it, for example a lift-link or chain or lift arm, is designated the 'upper' formation. The corresponding formation located in the region of the end of the hook, across the open mouth of the hook from the upper formation, is designated the 'outer formation'. And the other of the three formations is designated the 'intermediate formation', and lies (in terms of the longitudinal extent of the inner curved edge of the hook) half-way between the other two formations.

In embodiments of the invention described below, there is disclosed a method and apparatus for detecting overload distortion in lifting and the like gear. A typical application of the embodiment is to automotive engine-lifting and the like. Many other related applications exist, comprising a hook or comparable load-taking member (for example a tensioned-in-use link) and which is thus distortable by shock-loading or overloading or other abuse. Related (to hooks) quick-attach means exist in the materials-handling industry, in relation to attaching materials-handling buckets and other tools to operating means therefor, and which are susceptible to overload distortion. In accordance with the invention, the said hook or the like quick-attach means is provided with three or more reference points, for example in the form of formations such as inwardly or outwardly-projecting (concave or convex, whether rounded or not) location-defining formations, at locations thereon defining, in the undistorted state of said hook or the like, an isosceles or equilateral triangle. In accordance with the method of the invention, there is provided the step of comparing the dimensions of the two sides of the isosceles or equilateral triangle, one of these including the dimension of said hook or the like (such as the mouth of the hook) which is the more liable to dimensional increase in the case of overload distortion. If no overload distortion has occurred, the two dimensions will (within defined acceptable limits) be equal and will thus indicate that safe continuance of use may proceed. If the two dimensions are (within defined acceptable limits) unequal, then the method has detected overload distortion and appropriate remedial steps are required before safe repetition of loading can occur. It is to be noted that the application of the invention to not-strictly-hook-like quick attach means can only be achieved in the situation where the quick-attach means does have, as an intrinsic element of its structure, portions which can be designated a 'reference portion' (which is distorted, meaning non-elastically extended, on overload) and a 'standard portion' (which is not non-elastically extended on overload).

It will be understood that, in accordance with the principles of the invention, by choosing the location of the three location-defining formations so that, in a typical or commonly-occurring overload situation (such as the simple overloading of a hook of the kind shown in the embodiments described below) there is differential length-distortion of the opposite sides of the isosceles triangle by such overloading, and consequential readily-discernible-by-length-measurement dimensional change in the hook structure, the embodiments of the invention disclosed below provide a very practical method and means for on-site determination of the safety status of such apparatus.

In the embodiments described below, the three location-defining formations are in the form of upstanding projections forged-into the structure of the hook itself, and having well-defined rounded edges which are well-adapted to be conveniently engaged by (as shown in the drawings) the measuring edges or blades of a calliper gauge for comparison purposes. It is important to point out here that although the drawings show the use of a calliper-gauge being used in the method of the invention, and in that simple sense it might be thought that the present invention differs little from the 'measurement-and-look-up-to-compare' methods previously proposed, as discussed above, nothing could be further from the case. The point is that the use of a calliper as shown in the drawings illustrating the present invention, merely shows one very convenient way of comparing the dimensions of the two sides of the isosceles triangle provided in accordance with the invention, and notably, this is done without any need actually to see or note or indeed to be aware of the numerical value of the dimension. Moreover, although the comparison step can be done in other ways, as has already been mentioned, the use of a calliper gauge enables the user simply to apply the gauge first to one pair of formations and then to the other (one formation being common to both measurements), thereby enabling a comparison to be made 'mechanically' within a few seconds and without reference to any tables and without any memory requirements and indeed without the numerical value of the dimension entering into the comparison in any way.

Alternatives to location-defining projections include corresponding recesses and even painted or otherwise-applied markings, which could be used with some variation of the methodology. But the convenience of use of the above-described embodiments (due to these alternatives requiring visual reading and/or interpretation of length indications, and/or the use of specially-constructed callipers) would in most cases be significantly reduced because the described embodiments require mere calliper placement. Another factor is of course a need for considerable robustness of structure in the case of a hook which is subjected to everyday workshop usage, and in this regard a forged round-edged upstanding formation in the metal of the hook is hard to beat.

In the method of the invention, the step of comparing the dimensions of the opposite sides of the isosceles or equilateral triangle, across the dimension of the hook or the like (such as the mouth of the hook) which is the more liable to dimensional increase in the case of overload distortion, is important to the proper understanding of the methodology of the invention, and some additional disclosure in this regard is now provided in order to make clearer the relationship of this step to other aspects of the invention.

A first point in this regard relates to the basic question of elastic and non-elastic deformation of the hook, in use. Broadly, the invention relates to the situation where non-elastic deformation has occurred, and the hook does not fully recover from its state of deformation, so as to return to its dimensional state prior to deformation. In other words, the hook is permanently deformed by overload. This situation is to be contrasted with the more commonly occurring normal use situation where, during use, some degree of calculable elastic deformation is caused to the hook by the load applied to it, from which it fully recovers as soon as the load is released. In this latter case, of course, if the dimensional comparison step of the present invention is performed, the result will be that the two sides of the triangle will be found to be dimensionally-identical, and all is well for ongoing use of the hook in question. However, in the former case, where deformation of the hook has proceeded to a point beyond its elastic limit so that it is permanently deformed by the overload, a question of interpretation arises as follows: if such non-elastic deformation had occurred equally to both of the relevant two sides of the triangle defined by the location-defining points or formations, then when those two sides are dimensionally-compared, they would be found to be equal, despite the non-elastic deformation by the damaging overload, and the thus-obtained indication of compliance of the dimensions with the requirement for safety to continue use, would be invalid. Hence the feature of the invention, that one of the dimensions of the opposite sides of the isosceles or equilateral triangle that are compared includes the portion of said hook or the like (such as the mouth of the hook) which is the more liable to dimensional increase in the case of overload distortion in use.

It is a fact that, although the question might be raised that, theoretically at least, a hook of conventional open-mouthed format might be capable (depending on the exact line of action of the applied uplift and the corresponding line of action of the load carried by the hook) of being uniformly deformed beyond its elastic limit, whereby the dimensions compared in accordance with the invention might be equal despite overload-deformation beyond the elastic limit of the material, such is not the case. What actually happens in use is that a hook of this kind bends on overload, so that the mouth of the hook is more open than when originally made, and the reference dimension and the standard dimension measured between the relevant formations according to the invention, thereafter differ.

Thus, for example, it is to be understood that in the situation where the hook or the like has indeed suffered overload distortion, whether from shock-loading or simple overload or other abuse, it is usually the case that the mouth of the hook has opened somewhat and the dimension of the hook measured between the upper and outer formations (the reference dimension) is greater than that measured between the upper and intermediate formations (the standard dimension).

Embodiments of the invention will now be described by way of example and with reference to the accompanying drawings in which:

FIGS. 1 and 2 show side elevation views of a first embodiment of the invention in which a lift-hook is being checked for distortion after use, by means of a conventional calliper gauge applied across a first and a second pair of location-defining formations provided on the lift-hook;

FIG. 4 shows, on a larger scale, a portion of the view of FIG. 3, in which the location-defining formation is seen larger and thus more-clearly.

Figure 3:
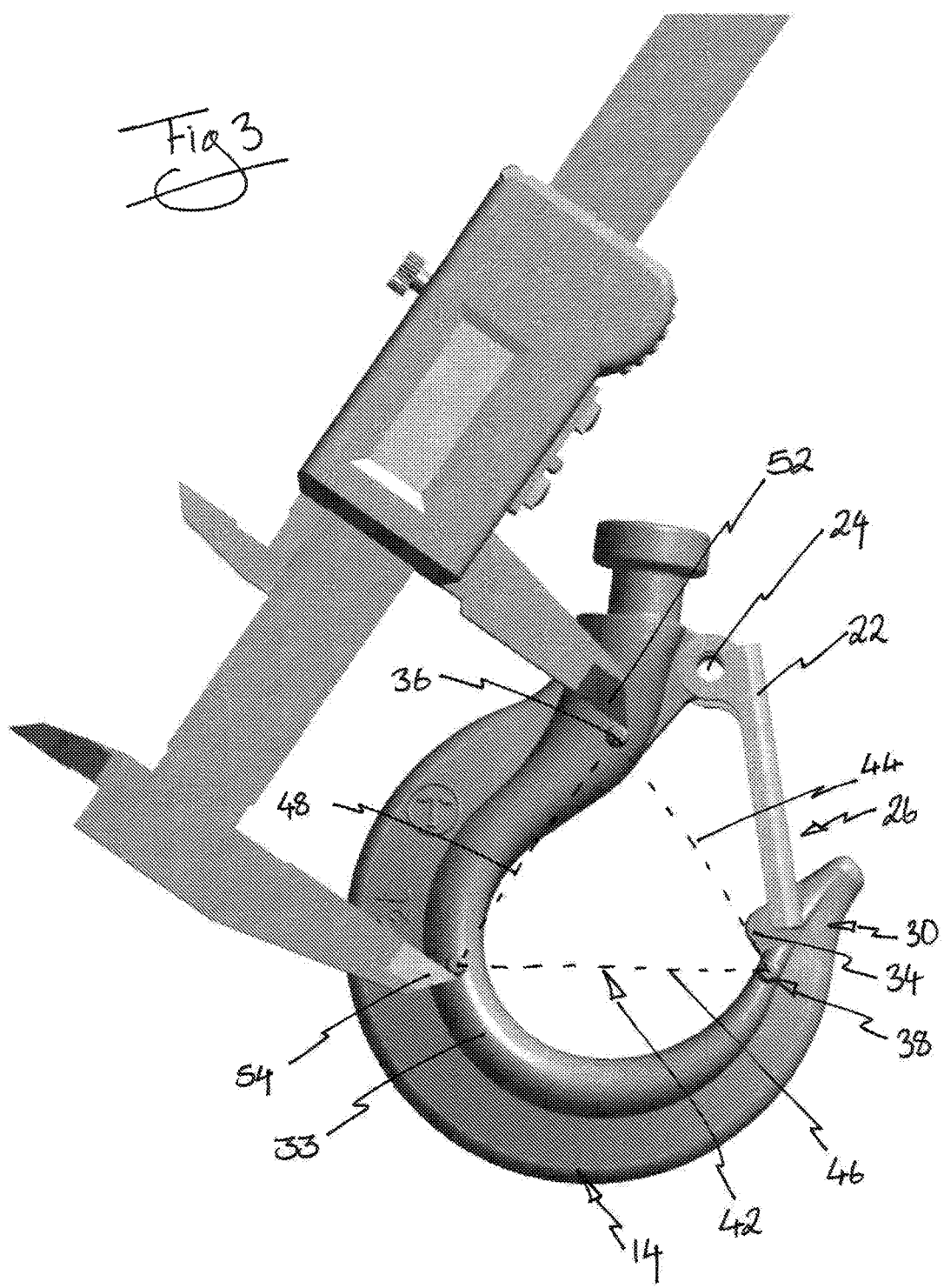
FIG. 3 shows, in a view corresponding to that of FIG. 1, a second embodiment of the invention.

In the embodiment of FIGS. 1 and 2 there is provided apparatus for detecting overload distortion in lifting and the like gear. In this embodiment, the 'apparatus' (to be described below) is actually embodied in the lifting gear itself, which comprises a lift hook 10. Lift hook 10 is for attachment to lifting gear (not shown), for example conventional automotive engine lifting gear of the kind commonly employed in automotive workshop situations for removing an automotive engine for servicing purposes, and to which the hook is connected via the upstanding integral lift boss 12 which is part of the metallic forging 14, which forms the main structure of hook 10. Hooks of this type can be used in many applications including, but not limited to, chain hoists and lifting slings and are used in many lifting and lashing applications for lift and securing objects. The hook 10 can be attached to, or form part of, a chain block or a lever hoist. For example, the hook 10 can form part of a chain block in which an attachments means (such as a clamp) is attached to a fixture (such as a beam) and a first hook in the chain bock hooks onto the clamp. Suspension means (such as a chain) is used to suspend from the attachment means and a further hook is attached to chain from which an object to be lifted is hung. Furthermore, the boss 12 may be replaced with any other suitable form of connecting means. For example, where a Clevis type is used the hook is directly connected to a chain or the hook may be connected to other apparatus using an eye hook.

Hook 10 constitutes quick-attach means in accordance with the invention, whereby an operative may readily cause it to engage lift chains (not shown) secured to an object and by simple signalling cause the object to be raised from its mounting. The lift chains (not shown) are, in use, simply caused to lie in the bottom of the curved inner profile 16 of the hook 10, so that, during the lifting operation, under the action of the uplift 17 applied to boss 12 by the lifting gear (not shown), the hook is loaded by the chains across approximately the majority of the extent of lower semi-circle of curved profile 16, from about location 18 to about location 20, the exact extent depending on the size of the links of the chains, and the resultant locations where these contact the hook. Of course alternatives to chains may be employed in other situations.

FIGS. 1 and 2 also show that lift hook 10 further comprises a non-return latch member 22, pivoted about an axis 24, and bridging across the open mouth 26 of hook 10, between a lift shoulder 28 at the upper end of hook 10, and the outer tip region 30 of the hook 10, so as to allow entry of lifting tension members or links such as the chains mentioned above, into the crook or curved inner profile 16 of the hook. The latch member 22 is spring-biased outwardly into the position shown in FIGS. 1 and 2, in which it prevents accidental escape of tension members from within the hook's compass, but permits the user readily to release such chains or the like after lowering of the lifting gear.

Hook 10 is, in the present embodiment, as shown in FIGS. 1 and 2, of approximately inverted question-mark front and rear elevational profile, being a forging comprising a generally flat-sided and rounded-edged outer dorsal rib 32 extending in the curved profile of the hook from the lift shoulder 28 to the hook's outer tip 30. Dorsal rib 32 is formed integrally with an inner round-section chain (or other lift member)-engaging rib 33, likewise extending from lift shoulder 28 to the hook's outer tip 30, but at the inner profile of the hook. Tip region 30 of the hook has a non-return lip 34 which co-operates with latch member 22, further to inhibit accidental escape of lifting chains, ropes or the like. In use, typically, hook 10 may be considered to be in the attitude in which uplift 17 applied to boss 12 is disposed vertically.

It will be understood from the above, that hook 10 is susceptible to overload distortion. For example, in the case where it is called on to lift an engine or other object which exceeds in weight the designed limit for the hook in question. Overload can also arise in the case of shock loadings.

In accordance with the invention, hook 10 is provided with three reference points, 36, 38 and 40, respectively in the region of lift shoulder 28, and outer end region 30 of the hook, and a location intermediate these first two locations. Thus these reference points are termed the upper reference point 36, the outer reference point 38 and the intermediate reference point 40.

The reference points 36, 38, 40 are each in the form of outwardly-projecting convex, but flat-topped location-defining formations, and are formed integrally with the metallic structure of hook 10 as part of the forged form of same. In accordance with the invention, the reference points 36, 38 and 40 are formed at locations on the hook which define, in the undistorted state of the hook, an isosceles or equilateral triangle 42. In the present embodiment, triangle 42 is an equilateral triangle having sides 44, 46 and 48. The dimension of side 44 constitutes the reference dimension, and the dimension of side 48 constitutes the standard dimension for the purposes of definition of the present invention.

In use, the lift hook 12 has applied thereto generally vertical uplift 17 against the weight of the engine applied via the chains between locations 18 and 20, whereby it can readily be seen from the elevation views of FIGS. 1 and 2 that there is a net loading of the hook in a direction such as to tend to increase the dimension of the mouth 26 of hook 10 between the reference formations 36 and 38. Under normal loads, merely elastic deformation of the hook occurs, with immediate return of the hook to its original dimensions on release of the load. However on overload or shock loading exceeding the elastic limit of the metallic structure of hook 10, there will be deformation.

In accordance with the method of the invention, the provision of the reference points 36, 38 and 40 at the corners of equilateral triangle 42 enables the user to carry out the step of comparing by means of calliper gauge 50 having blades 54, 56 the dimensions of the sides 44 and 48 of the (as original equipment) equilateral triangle 42, of which, side 44 extends across the dimension of the hook which includes the mouth 26 of the hook and thus is the more liable to dimensional increase in the case of overload distortion.

If no overload distortion has occurred, the two dimensions 44 and 48 of the triangle sides will (within defined acceptable limits) be equal and will thus indicate that safe continuance of use of hook 10 may proceed. If the two dimensions are (within defined acceptable limits) unequal, then the method has detected overload distortion and appropriate remedial steps are required before repetition of loading can occur.

FIGS. 3 and 4 are included to show further details of the embodiment of FIGS. 1 and 2, notably in relation to the structure and form of the hook 10 itself, and more particularly in relation to the reference points 36, 38 and 40 and their construction as integral parts of the metallic structure of hook 10. As can be seen more clearly in FIG. 4, the upper reference point and formation 36 is generally circular as seen in the plan-view direction available in FIG. 4, it is upstanding from the adjacent structure of hook 10, and has a flat top 56, with a cylindrical side surface 58 appropriate for easy co-operation with the blade 52 of calliper gauge 50. The other two reference formations 38 and 40 are of identical construction.

It will be appreciated by persons skilled in the art that the above embodiments have been described by way of example only and not in any limitative sense, and that various alterations and modifications are possible without departure from the scope of the protection which is defined by the appended claims. For example, the invention can be applied to non-hook-format lifting and the like gear and to other quick-attach devices. The selection of the locations for the reference formations is to be done in the light of the discussion above in relation to the zone of the quick-attach device which is the more liable to dimensional distortion in the case of overload, and does not have to be done exactly in the manner shown in the accompanying drawings. Furthermore, any different formats of lift hooks exist and the invention is widely applicable to these. It is also the case that it would be relatively straightforward to provide an embodiment of the invention comprising four reference points, instead of three, in which the upper reference point in the above described embodiment is not 'common' to both the reference dimension and the standard dimension, but the latter dimension is defined by two entirely independent reference points, though one of these might be quite close to the upper reference point, and of course, in the undistorted state of the hook or the like, the reference and standard dimensions would remain the same.

The invention claimed is:

1. A method for detecting overload distortion in lifting gear comprising:
   (i) providing a hook which is susceptible to overload distortion;
   (ii) providing said hook with three reference points at locations thereon defining, in an undistorted state of said hook, an isosceles or equilateral triangle; and
   (iii) comparing the dimensions of two sides of said isosceles or equilateral triangle, one of which includes the dimension of said hook which is the more liable to dimensional increase in the case of overload distortion, after subjecting said hook to possible overloading.

2. A method according to claim 1 wherein the step of comparing the dimensions of two sides of said isosceles or equilateral triangle is performed by applying a piece of string or thread across pairs of said reference points defining said isosceles or equilateral triangle.

3. A hook which is susceptible to overload distortion; said hook comprising two reference points thereon defining, in the undistorted state of said hook, a reference length in a portion of said hook which is liable to dimensional increase in the case of overload; said reference length being comparable with known length data after subjecting said hook to possible overloading, in order to determine whether overload distortion has occurred; and said hook comprising, in addition to said two reference points defining said reference length, at least one further reference point that at least partially defines said known length data, said further reference point being provided on said hook and conveniently accessible for reference purposes.

4. A hook according to claim 3 wherein said reference points defining said reference length and said known length data comprises three such points disposed at the corners of an isosceles triangle.

5. A hook according to claim 4 wherein said reference points are disposed at the corners of an equilateral triangle.

6. A hook according to claim 3 wherein said reference points are provided in the form of upstanding projections that extend from a surface of the hook and are formed integrally therewith, the upstanding projections having side surfaces adapted for engagement with blades of an adjustable tool that is adapted to be rapidly adjusted to the dimension of said reference length and for rapid disengagement therefrom and re-engagement with the reference points defining said known data for detection of any difference in dimension.

7. A lifting device comprising:
   at least one attachment device for attaching the device to a fixture;
   at least one suspension device for suspending from the at least one attachment device; and
   at least one hook according to claim 3.

8. A hook according to claim 3 wherein said reference length is measured between said two reference points and wherein said known length data is measured between a first of said two reference points and said further reference point.

9. A hook according to claim 3 wherein the hook comprises a lifting boss configured to couple the hook to lifting gear, the hook comprising a longitudinal axis that intersects a first of said two reference points and said lifting boss, and wherein a second of said two reference points is located on a first side of said longitudinal axis and said further reference point is located on a second side of said longitudinal axis.

10. The hook according to claim 3 wherein said two reference points and said further reference point are located at corners of an isosceles triangle, and wherein said reference length is a measurement of a first side of said isosceles triangle and said known length data is a measurement of a second side of said isosceles triangle.

* * * * *